United States Patent [19]

Rogers et al.

[11] Patent Number: 4,608,429
[45] Date of Patent: Aug. 26, 1986

[54] LOW-MELTING AROMATIC POLYESTERS WITH REPEATING 2,2'-SUBSTITUTED-BIPHENYLENE RADICALS

[75] Inventors: Howard G. Rogers, Weston, Mass.; Russell A. Gaudiana, Merrimack, N.H.; Richard A. Minns; Roger F. Sinta, both of Arlington, Mass.

[73] Assignee: Polaroid Corporation, Patent Dept., Cambridge, Mass.

[21] Appl. No.: 674,515

[22] Filed: Nov. 23, 1984

[51] Int. Cl.$^4$ .............................................. C08G 63/18
[52] U.S. Cl. ..................... 528/194; 528/176; 528/179; 528/190; 528/191; 528/193
[58] Field of Search ............... 528/194, 191, 190, 193

[56] References Cited

U.S. PATENT DOCUMENTS

| | | | |
|---|---|---|---|
| 3,008,929 | 11/1961 | Wielicki et al. | 260/75 |
| 3,786,022 | 1/1974 | Hata et al. | 260/47 |
| 4,066,620 | 1/1978 | Klienschuster et al. | 260/47 |
| 4,083,829 | 4/1978 | Calundann et al. | 260/47 |
| 4,238,600 | 12/1980 | Jackson, Jr. et al. | 528/193 |
| 4,288,588 | 9/1981 | Donohue | 528/348 |
| 4,433,132 | 2/1984 | Rogers et al. | 528/191 |

*Primary Examiner*—Harold D. Anderson
*Attorney, Agent, or Firm*—Louis G. Xiarhos

[57] ABSTRACT

A class of aromatic polyesters exhibiting melt processability is disclosed. A portion of repeating 2,2'-substituted-biphenylene radicals in an aromatic polyester is replaced by certain other aromatic radicals to provide an aromatic polyester which exhibits low-melting properties, melt processability and melt anisotropy. The aromatic polyesters can be melt processed to films and fibers.

22 Claims, No Drawings

LOW-MELTING AROMATIC POLYESTERS WITH REPEATING 2,2′-SUBSTITUTED-BIPHENYLENE RADICALS

BACKGROUND OF THE INVENTION

This invention relates to certain aromatic polyesters which exhibit desirable melt processability and which are useful in the production of films and fibers. More particularly, it relates to aromatic polyesters containing repeating 2,2′-substituted biphenylene radicals and having at least a portion of such radicals replaced by other aromatic radicals for the realization of low-melting and melt-processable characteristics.

The production of polyesters, including aromatic polyesters, by the polycondensation of dicarboxylic acids (or the corresponding acyl halides) and polyhydric alcohols has been well known. For example, the production of polyesters is described in U.S. Pat. No. 3,008,929 (issued Nov. 14, 1961 to E. A. Wielicki); in U.S. Pat. No. 3,786,022 (issued Jan. 15, 1974 to N. Hata et al.); in U.S. Pat. No. 4,066,620 (issued Jan. 3, 1978 to J. J. Kleinschuster); in U.S. Pat. No. 4,083,829 (issued Apr. 11, 1978 to G. W. Calundann et al.); in U.S. Pat. No. 4,288,588 (issued Sept. 8, 1981 to J. A. Donohue); and in U.S. Pat. No. 4,433,132 (issued Feb. 21, 1984 to H. G. Rogers et al.). In general, it is well recognized that the mechanical and physical properties of polymeric films and fibers will depend upon the chemical structure of the polymers from which they are prepared and that such properties can be materially influenced by such molecular factors as chain stiffness, intermolecular forces, orientation and crystallinity. Accordingly, there has been considerable interest in the development of polyesters having particular structural or molecular configurations for the realization of one or more particular properties suited to a desired application.

In the production of polyester films and fibers, it will generally be advantageous to prepare such films and fibers either from a solution of the polyester in a common and readily available solvent or from a processable melt of the polyester material. Frequently, and particularly in the case of wholly aromatic polyesters, the polyester material may be substantially insoluble; and when the polyester can be suitably dissolved and processed from a solvent material, film and fiber production will require the handling and recovery of the solvent, usually organic, material. Moreover, melt processability is frequently hampered by the tendency of the polyester materials to be melt processable only at elevated temperatures which, in some instances, may approach the onset of thermal degradation. It will be appreciated that the characteristic and advantageous properties of a polyester suited to a particular application will be more readily realized where the polyester material exhibits low-melting behavior and can be melt processed into films and fibers at relatively low processing temperatures.

SUMMARY OF THE INVENTION

The present invention provides a class of low-melting, melt-processable polyesters and is based in part upon the discovery that the replacement of a portion of the 2,2′-substituted-4,4′-biphenylene radicals of an aromatic polyester with certain other aromatic radicals imparts to the polyester a low-melting character that facilitates low-temperature melt processability. Films and fibers which exhibit certain desired optical properties, e.g., birefringence, can be provided from the melt-processable polyester material.

According to the present invention, there is provided a polyester comprising repeating radicals of the following formulas:

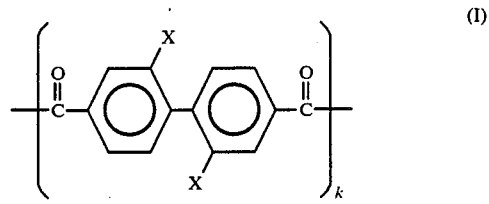

wherein X is a substituent other than hydrogen, and k represents the molar amount of the formula (I) radical in the polyester;

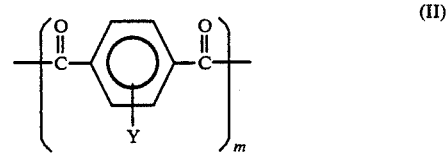

wherein Y is hydrogen or a substituent other than hydrogen, and m represents the molar amount of the formula (II) radical in the polyester;

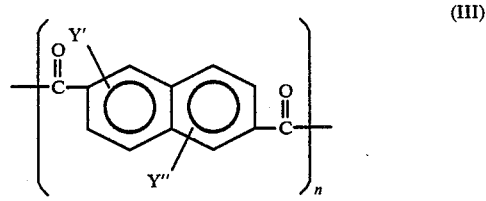

wherein each of Y′ and Y″ represents hydrogen or a substituent other than hydrogen, and n represents the molar amount of the formula (III) radical in the polyester; and

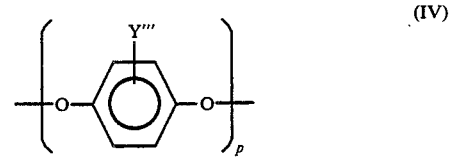

wherein Y‴ is hydrogen or a substituent other than hydrogen, and p represents the molar amount of the formula (IV) radical in the polyester; the molar proportions of formula (I), (II), (III) and (IV) radicals conforming to the following relationships:

$$\frac{k}{k+m+n} = 0.2 \text{ to } 0.8;$$

$$\frac{m+n}{k+m+n} = 0.2 \text{ to } 0.8; \text{ and}$$

$$\frac{k}{k+m+n} + \frac{m+n}{k+m+n} = 1 = \frac{p}{k+m+n}$$

DETAILED DESCRIPTION OF THE INVENTION

It will be seen from inspection of the aforedescribed formula (I) to (IV) radicals and molar proportion relationships that the polyesters hereof contain a combination of particular divalent radicals which are present in certain defined molar proportions. The formula (I), (II) and (III) radicals can be considered collectively as being derived from a difunctional acid (or halide) component of the polyester, while the formula (IV) radical derives from a dihydric alcohol component of the polyester. The formula (I) radical will be present in the polyester, in relation to the sum of such acid-derived (I), (II) and (III) radicals, in a mole ratio of from 0.2 to 0.8; and the balance of said sum to 1 will comprise formula (II) and (III) radicals, either of which may be absent, the formula (II) and (III) radicals, in combination and in relation to the sum of the (I), (II), and (III) radicals, also being present in a mole ratio of from 0.2 to 0.8. In general, polyesters can be readily synthesized by the condensation reaction of a dibasic acid (or the corresponding halide) and a dihydric alcohol. Such methodology is applicable to the production of the random copolyesters hereof and, accordingly, the polyesters of the present invention can be represented as comprising repeating units of the formula (V)

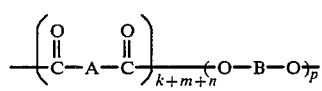
(V)

wherein the radical

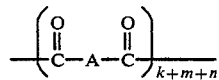

represents the sum of the formula (I), (II) and (III) difunctional acid-derived radicals in the polyester; the

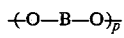

radical represents the formula (IV) dihydric alcohol-derived radical; and k, m, n and p define the molar amounts of the formula (I), (II), (III) and (IV) radicals in the polyester. The nature of each of the radicals of the polyesters hereof is described in greater detail as follows.

The formula (I) divalent radical of the polyesters conforms, as indicated, to the formula

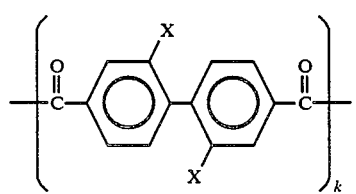
(I)

wherein each of the 2,2'-substituents is a substituent other than hydrogen. The formula (I) radical comprises an essential part of the polyester and contributes to high birefringence observed in films and fibers prepared therefrom. This radical (also referred to herein for convenience as including a 2,2'-substituted-4,4'-biphenylene radical) contains X substituents which promote a noncoplanar (or "twisted") molecular configuration with respect to the interbonded phenylene nuclei of the radical. This non-coplanarity is believed to be importantly related to the realization of high birefringence. The nature of substituent groups which promote high birefringence in polymers having interbonded phenylene radicals and the manner in which such substituents promote high birefringence useful in optical devices have been described, for example, in U.S. Pat. No. 4,384,107 (issued May 17, 1983 to H. G. Rogers et al.) and in U.S. Pat. No. 4,446,305 (issued May 1, 1984 to H. G. Rogers et al.).

Suitable X substituents include halogen (e.g., fluoro, bromo, chloro); nitro; alkyl (e.g., methyl, ethyl); alkoxy (e.g., methoxy); substituted-alkyl (e.g., trifluoromethyl or hydroxymethyl); cyano; hydroxy; thioalkyl (e.g., thiomethyl); carboxyl; sulfonic acid esters; sulfinic acid esters; carboxyamide; sulfonamide; amino; and acyl (e.g., acetyl). Preferred X substituents, which can be the same or different, include halo, nitro, alkoxy and substituted-alkyl (e.g., trifluoromethyl). An especially preferred X substituent is the aforementioned trifluoromethyl group which permits the production of polyesters exhibiting desirable birefringence and which promotes solubility of the polyesters in certain readily available solvent materials, as described in the aforementioned U.S. Pat. No. 4,443,132. If desired, the phenylene nuclei of the formula (I) radical can contain additional substituent moieties, provided that such substituents do not adversely interfere with desired low-melting processability. Suitable substituents include those hereinbefore described in connection with the X substituent groups.

The formula (I) radical will be present in the polyesters hereof at a mole ratio, in relation to the sum of the formula (I), (II) and (III) radicals, of from 0.2 to 0.8. A ratio of at least 0.2 allows for the presence of a sufficient amount of the formula (I) radical to promote high birefringence in oriented films and fibers prepared from the polyester materials. The ratio can extend upwards to about 0.8 and, thus, allows for the inclusion of other radicals (formula (II) and/or (III) radicals described hereinafter) which serve to reduce the temperature at which melt processability of the polyester is observed. A preferred ratio is in the range of about 0.3 to 0.6, typically, about 0.5.

The formula (II) and (III) radicals present in the polyester of the invention provide low-temperature processability. In the formula (II) radical,

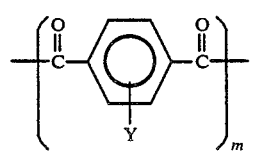
(II)

Y can be hydrogen or a substituent other than hydrogen. Suitable substituent Y groups are those described hereinbefore in connection with the X substituents of the formula (I) radicals. Preferably, Y will be hydrogen, i.e., the formula (II) radical will be 1,4-phenylene dicarbonyl; or Y will be substituted-alkyl group (e.g, trifluoromethyl).

In the formula (III) radical, Y' and

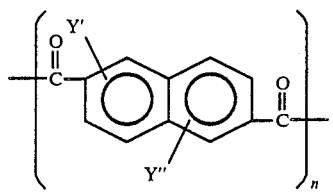

(III)

Y″ can have the same meaning as Y defined hereinbefore. Preferably, Y′ and Y″ will each be hydrogen, i.e., the formula (II) radical will be 2,6-naphthylene dicarbonyl.

Either of the formula (II) and (III) radicals can be absent from the polyesters of the invention, i.e., either of m and n can be zero. The combined molar ratio of the formula (II) and (III) radicals, in relation to the sum of the formula (I), (II) and (III) radicals, will be in the range of from 0.2 to 0.8 and will comprise the balance to one of the (I), (II) and (III) radicals. The presence of the formula (II) and/or (III) radicals at a molar ratio of at least 0.2 allows for reduction in the melting temperature of the polyester. A ratio greater than about 0.8 tends to limit the amount of formula (I) radical that can be included in the polyester for the provision of high birefringence. According to a preferred method of achieving low-melt processability, the formula (II) radical will be employed at an equimolar level with the formula (I) radical for the combined realization of highly birefringent films and fibers and low-melt processability.

The formula (IV) radical of the aromatic polyesters of the invention, i.e., the radical

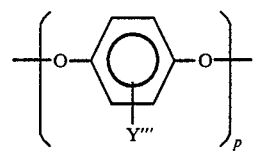

(IV)

can be introduced into the polyester by reaction of an aromatic dihydric alcohol. According to stoichiometric requirement, the molar amount, p, of formula (IV) units will equal the molar amount of the sum of the formula (I), (II) and (III) radicals, i.e., the sum of k, m and n. The Y‴ group of the formula (IV) radical can be hydrogen or can be a substituent other than hydrogen, for example, a substituent as defined in connection with the X substituent of the formula (I) radical. Suitable compounds for introducing the formula (IV) radical into the formula (V) repeating units of the polyesters include hydroquinone, chlorohydroquinone and methylhydroquinone. A preferred compound is an halo-substituted hydroquinone, such as chlorohydroquinone.

Inclusive of polyesters of the present invention are the polyesters represented by the following structures wherein indicated subscripts represent the molar amount of the respective radical in the polyester.

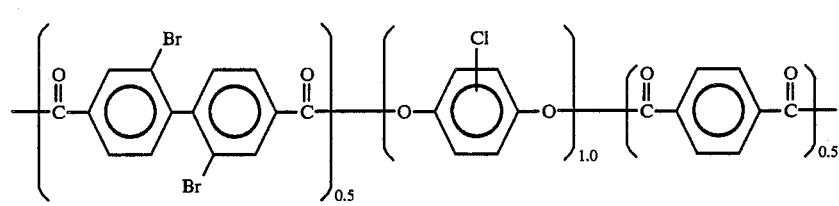

(VI)

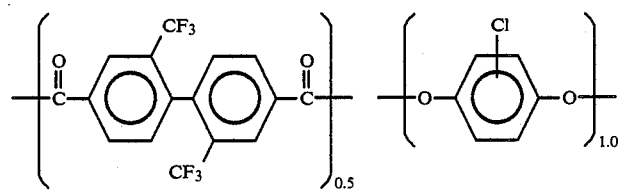

(VII)

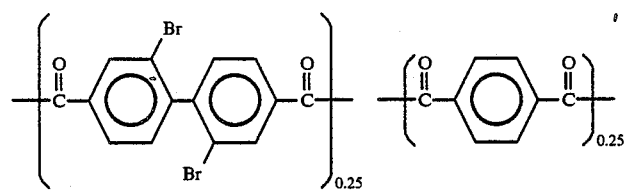

(VIII)

-continued
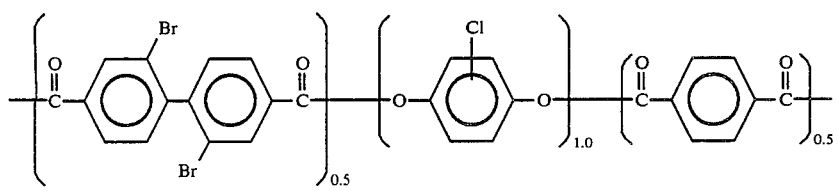 (IX)
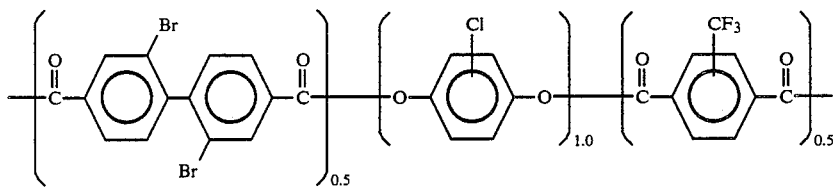 (X)
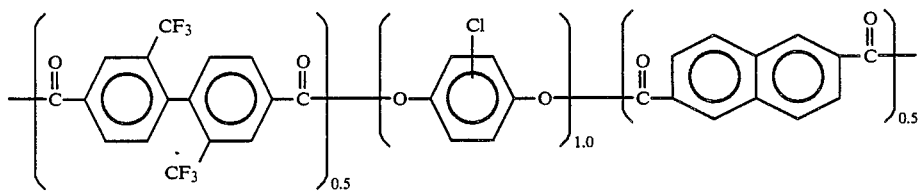 (XI)
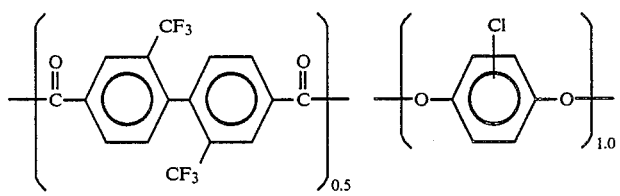
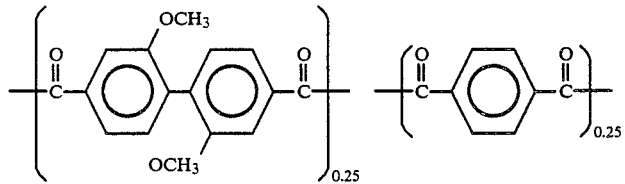 (XII)
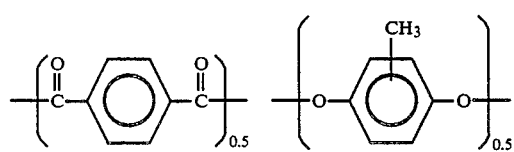
(XIII)
(XIV)

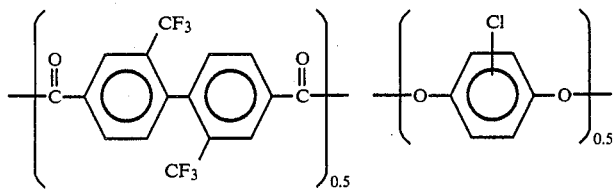

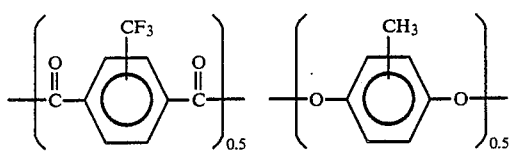

While the polyester described hereinbefore can consist essentially of repeating units represented by the formula (V) unit, i.e.

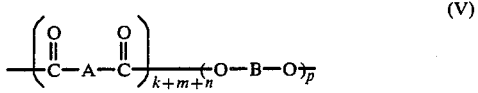
(V)

wherein the A and B radicals are as previously defined, the polyester can also include repeating units which do not conform to formula (I), (II), (III) or (IV) radicals of the formula (V) polyester repeating units. Examples of repeating units which do not conform to such descriptions and which can be present in the polyesters hereof in proportions which do not undesirably elevate the melting temperature of the polymeric material include repeating units having the formula (XVI) structure $$-\overset{O}{\underset{\parallel}{C}}-G-\overset{O}{\underset{\parallel}{C}}-O-G'-O- \qquad (XVI)$$

wherein, for example, at least one of divalent radicals G and G' represents an aliphatic radical or an aromatic radical other than as defined in the formula (I), (II), (III) or (IV) radicals hereof. Thus, in the formula (XVI) repeating units, G and G' can be 1,2-ethylene; 1,2-propylene; 1,3-propylene; 1,4-phenylene; 1,3-phenylene; 4,4'-biphenylene; the stilbene radical of the formula

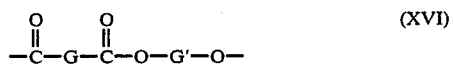

corresponding substituted stilbene radicals; biphenylene radicals interbonded through methylene, ether, sulfone, sulfide or like group; trans-vinylene; ethynlene; 2,4'-trans-vinylenephenylene; and polyunsaturated divalent radicals such as trans,trans-1,4-butadienylene and 1,4-dimethyl-trans,trans-1,4-butadienylene.

It will be appreciated that the nature of the radicals which are incorporated into the polyesters hereof, including the formula (I), (II), (III) and (IV) radicals and any optional formula (XVI) repeating units that may be present, will affect the properties observed in the polyester material. Where the polyester material is desirably employed as a birefringent layer in an optical device, it will be preferred that the presence of formula (XVI) repeating units be avoided or minimized. The formula (I), (II), (III) and (IV) radicals contain essentially coaxial, chain-extending bonds that are suited to the provision of a rigid, rod-like character. For example, aromatic radicals having para-oriented chain-extending bonds will be preferred where a rigid rod-like polymer exhibiting highly birefringent behavior in oriented films or fibers is desired.

Radicals having a flexible character such as alkylene radicals and biphenylene radicals interbonded through methylene, ether, sulfone, sulfide or the like, and phenylene radicals having ortho- or meta-oriented bonds, should be avoided where a birefringent polymer is desired, but can be included in the formula (XVI) repeating units for predetermined modification of the properties of the polyester material. The inclusion of such radicals in formula (XVI) repeating units can, for example, be employed for further reduction in the melting temperature of the polyester.

The polyesters of the present invention can be prepared by a solution polycondensation or melt polycondensation reaction depending upon the melting point or solubility of the particular reactants employed. In general, the polyesters are random copolyesters and can be prepared by reaction of a mixture of dicarboxylic acids (or corresponding acid halides or alkyl esters) with a polyhydric alcohol according to known polycondensation methods. For example, a polyester containing repeating units of the type represented by the formula (V) can be suitably prepared by the reaction of: (1) a mixture of dicarboxylic acid halides of the formula

(where Hal represents halogen, such as chloro or bromo and A is an aromatic divalent radical as described in connection with the formula (I), (II) and (III) radicals); and (2) a polyhydric alcohol of the formula HO-B-OH (wherein B is an aromatic divalent radical as shown in formula (IV), i.e.,

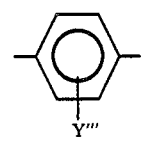

(XV)

and wherein Y''' has the meaning aforedescribed). Thus, a mixture, for example, of 2,2'-bis(trifluoromethyl)-4,4'-biphenyl dicarbonyl chloride and 2-trifluoromethyl-1,4- phenylene dicarbonyl chloride can be reacted with chlorohydroquinone to provide a polyester having repeating units as illustrated by formula (VIII).

In the case, for example, of a solution polycondensation reaction, the polyester can be obtained by reaction of the mixture of diacid halides with the polyhydric alcohol in a suitable inert organic solvent and in the presence of a catalyst (or acid acceptor) which neutralizes hydrogen chloride formed, e.g., pyridine.

An inert organic solvent is utilized to dissolve the polyester produced by the polycondensation reaction. Suitable solvents include chloroform, methylene chloride, 1,2-dichloroethane, 1,1,2,2-tetrachloroethane, dimethylsulfoxide, N,N-dimethylformamide and acetone. In general, the polyester is obtained by reaction of one mole of the polyhydric alcohol with 1.0 to 1.05 moles of the diacid halide mixture in the organic solvent and in the presence of at least two moles of the acid acceptor. The polycondensation can be conducted at a temperature of about 20° C. to about 150° C. or higher depending upon the boiling point of the solvent. Suitable acid acceptors include the tertiary amines, such as the trialkyl amines, e.g., triethylamine; or heterocyclic amines, e.g., pyridine.

The polyesters hereof can also be prepared by a known melt polycondensation technique whereby one mole of a diacetate of the polyhydric alcohol is reacted with 1.0 to 1.1 moles of the dicarboxylic acid mixture in the presence of a catalyst. The reaction mixture is heated in a stream of inert gas, e.g., nitrogen, to a reaction temperature between the melting temperature and the decomposition temperature of the monomers and the reaction pressure is reduced to below about 60 mm. Hg for removal of acetic acid produced by the reaction.

Further heating above the melting temperature of the polyester product and reduction of the reaction pressure to below about 5 mm Hg results in additional removal of acetic acid by-product. Organometallic compounds such as titanium dioxide, antimony trioxide and butyl orthotitanate can be suitably employed as catalysts for the melt polycondensation reaction.

Polyesters of the present invention can also be prepared by ester interchange according to generally known procedure. Thus, one mole of a dialkyl ester of the dicarboxylic acid mixture can be reacted with from about 1.1 to 2.5 moles of polyhydric alcohol, generally at atmospheric pressure, although subatmospheric or superatmospheric conditions can be employed. Suitable catalysts for the ester interchange reaction, which is generally conducted over a range of from about 90° C. to 325° C., include calcium acetate, sodium methoxide, antimony trioxide and tetraisopropyl titanate. During the ester interchange reaction, an alcohol is removed as a by-product and heating is continued to effect the polycondensation.

The preparation of polyesters hereof can be illustrated by the following reaction schemes: Reaction 1(a) involving the solution polycondensation of terephthaloyl chloride, 2,2'-bis(trifluoromethyl)-4-4'-biphenyl dicarbonyl chloride and chlorohydroquinone in 1,1,2,2-tetrachloroethane (TCE) solvent using pyridine as an acid acceptor; and Reaction 1(b) involving the solution polycondensation of 2,2'-dibromo-4,4'-biphenyl dicarbonyl chloride, 2-trifluoromethyl-1,4-phenylene dicarbonyl chloride and chlorohydroquinone, using TCE solvent and pyridine as an acid acceptor.

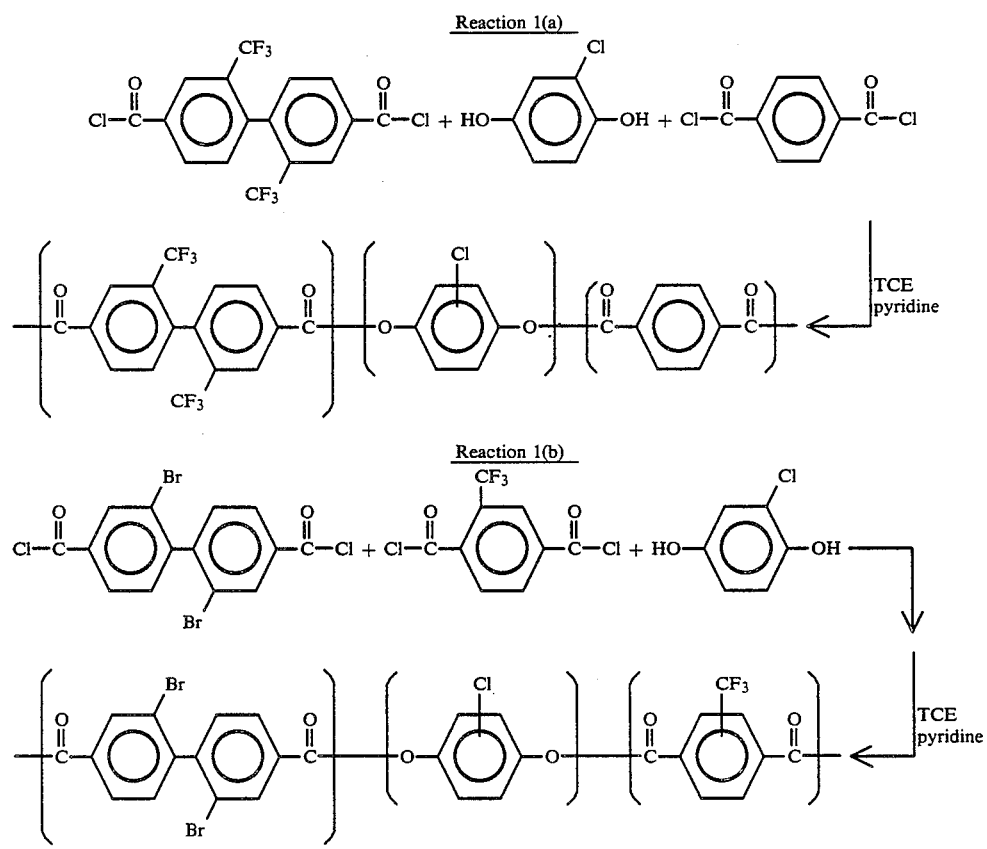

The polyesters of the present invention can be conveniently prepared from known monomeric compounds. For example, the 2,2'-bis(trifluoromethyl)-4-4'-biphenyl dicarbonyl chloride shown in Reaction 1(a) can be prepared in the manner described in the aforementioned U.S. Pat. No. 4,433,132, issued Feb. 21, 1984 to H. G. Rogers et al. The 2,2'-dibromo-4,4'-biphenyl dicarbonyl chloride can be prepared in the manner described by H. G. Rogers et al. in U.S. Pat. No. 4,384,107, issued May 17, 1983. The 2-trifluoromethyl-1,4-phenylene dicarbonyl chloride shown in Reaction 1(b) can be prepared according to the procedure of Kan Inukai and Yasuo Maki, Kogyo Kagaku Zasshi, 68(2), 315 (1965).

The polyesters of the present invention are especially advantageous from the standpoint of their processability at lower temperatures, e.g., in the range of about 115° C. to 205° C. The improved melt processability of the polyesters of the invention, relative to aromatic polyesters in general, which are only melt processable at higher temperatures, permits improved handling of the polymers and allows for production of polymeric layers without the requirements of solvent handling and recovery. Films and fibers or other shaped forms of the polyesters can be redissolved and reshaped or refabricated if desired. Depending upon the nature of other recurring units as may be present in the polyester materials, the melt-processing characteristics of the polyesters hereof can be varied or controlled to suit particular applications.

The polyesters of the present invention can be variously formed or shaped into films, sheets, coatings, layers, fibrils, fibers or the like. Melt-casting, injection-molding and like forming and shaping techniques can be used for this purpose. If desired, a melt of the polyester can be cast onto a suitable support material for the formation of a polymeric film or layer of the polyester material. The polymeric film can be subjected to stretching so as to introduce molecular orientation and provide a film material having a birefringent character.

If desired, the polyesters can be formed into fibers, fibrils or the like by melt extrusion methods known in the art. Thus, for example, a melt of the polyester can be extruded into the form of fibers which can be cut, stretched or assembled into fiber tows or bundles as desired.

Where a molecular orientation is permanently induced in the polyester material, as by formation of the polyester into a oriented sheet, fiber or other form, the polyester will exhibit optical birefringence which can be measured in accordance with a number of known methods. Known shaping or forming methods can be utilized to induce such orientation. Preferably, this will be accomplished by unidirectional stretching of a polymeric film, by extrusion of the polymer into a sheet, fiber or other stretched form, or by the combined effects of extrusion and stretching. In general, greater birefringence will be observed in the case of polymeric materials exhibiting a greater degree of molecular orientation.

The polyesters of the present invention can be utilized in the construction of a variety of optical filter or other devices. Optical devices in which the polyesters of the invention can be utilized, and their method for construction and modes of operation are described in detail in U.S. Pat. No. 4,446,305 of H. G. Rogers et al., issued May 1, 1984. Examples of other devices which can be adapted to include a polymeric and birefringent layer as described herein are described, for example, in U.S. Pat. No. 3,506,333 (issued April 14, 1970 to E. H. Land); in U.S. Pat. No. 3,213,753 (issued Oct. 26, 1965 to H. G. Rogers); in U.S. Pat. No. 3,610,729 (issued Oct. 5, 1971 to H. G. Rogers); in U.S. Pat. No. 3,473,013 (issued Oct. 14, 1969 to H. G. Rogers); in U.S. Pat. No. 3,522,984 (issued Aug. 4, 1970 to H. G. Rogers); in U.S. Pat. No. 3,522,985 (issued Aug. 4, 1970 to G. H. Rogers); in U.S. Pat. No. 3,528,723 (issued Sept. 15, 1970 to H. G. Rogers); and in U.S. Pat. No. 3,582,424 (issued June 1, 1971 to K. Norvaisa).

The following non-limiting examples are illustrative of the present invention. All percentages are by weight except as otherwise indicated.

EXAMPLE 1

This example illustrates the polycondensation of chlorohydroquinone, 2,2'-bis(trifluoromethyl)-4,4'-biphenyl dicarbonyl chloride and 2-trifluoromethyl-1,4-phenylene dicarbonyl chloride.

A solution of 2-trifluoromethyl-1,4-phenylene dicarbonyl chloride (136 mgs.) and 2,2'-bis(trifluoromethyl)-4,4'-biphenyl dicarbonyl chloride (208 mgs.) in 1,1,2,2-tetrachloroethane (TCE, 1.5 mls.) was added dropwise to a well-stirred solution of chlorohydroquinone in 1.5 mls. of TCE and 0.6 ml. of pyridine under argon. After stirring at room temperature for 24 hours, 25 mls. of methylene chloride were added to the viscous solution and the polymer was precipitated by pouring the solution into 500 mls. of methanol. After filtering, washing with methanol and drying, 388 mgs. (93.5% yield) of white polymer containing repeating units of formula (VIII) hereinbefore, was obtained. Elemental analysis based on $C_{37}H_{15}O_8F_9Cl_2$ gave the following results:

|    | CALCULATED (%) | FOUND (%) |
| --- | --- | --- |
| C  | 53.58 | 53.49 |
| H  | 1.82  | 1.89  |
| F  | 20.62 | 20.40 |
| Cl | 8.55  | 8.47  |

Inherent viscosity of the polymer (1.50) was determined at a concentration in TCE of 0.5 g./dl. at 30° C. The melting temperature of the polymer (115° C.) was determined by hot-stage microscopy using a heated sample positioned between crossed polarizers. The temperature at which the heated sample exhibited melt anisotropy was observed and recorded. Birefringence (0.253) of fibers pulled from a melt of the polymer was determined by Becke' line analysis and Jamin-Lebedeff techniques.

EXAMPLES 2 to 9

Using the polycondensation method described in EXAMPLE 1, other polyesters having repeating units as described hereinbefore and identified in Table 1 were prepared. Values reported in Table 1 for inherent viscosity, melting temperature and birefringence were determined using the techniques described in EXAMPLE 1, except as otherwise indicated in the table.

TABLE 1

| Example | Polyester (Formula #) | Inherent Viscosity (dl./g.) | Melting Temperature (°C.) | Birefringence |
| --- | --- | --- | --- | --- |
| 2 | (VI)  | 1.47  | 185 | 0.254 |
| 3 | (VII) | 1.09  | 150 | 0.255 |
| 4 | (IX)  | 0.85* | 205 | 0.254 |

TABLE 1-continued

| Example | Polyester (Formula #) | Inherent Viscosity (dl./g.) | Melting Temperature (°C.) | Birefringence |
|---|---|---|---|---|
| 5 | (X) | 0.70 | 185 | 0.226 |
| 6 | (XI) | 0.58* | 205 | — |
| 7 | (XIII) | 0.73 | 143 | 0.242 |
| 8 | (XIV) | 0.68 | 145 | 0.250 |
| 9 | (XV) | 0.63 | 143 | 0.239 |

*determined in TCE/p-chlorophenol (1/1,v/v)

From the data presented in EXAMPLES 1 to 9 it will be seen that the polyesters thereof combine good birefringence and relatively low melting temperatures.

CONTROL EXAMPLE

For purposes of comparison with the melting temperatures of the polyesters of EXAMPLE 1 to 9, polyesters having the following repeating units were prepared:

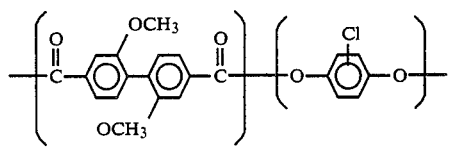

Control-1

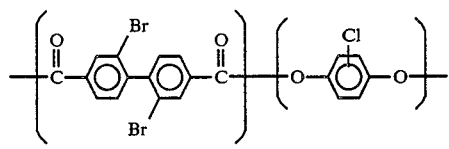

Control-2

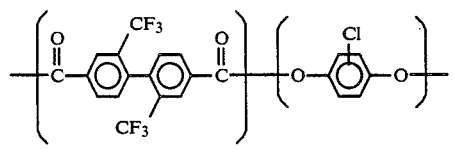

Control-3

The polyester identified as Control-1 simultaneously melted and decomposed at 340° C. The polyester identified as Control-2 simultaneously melted and decomposed at 350° C. The polyester identified as Control-3 and described in EXAMPLE 5 of U.S. Pat. No. 4,433,132, upon heating to 350° C. on a Fisher-Johns melting point apparatus, softened slightly but did not discolor. Thermogravimetric analysis of the Control-3 polyester showed that the onset of decomposition in nitrogen occurred at 500° C.; differential scanning calorimetry failed to detect any transitions up to 325° C. It will be seen by a comparison with the melting temperatures reported in TABLE 1 that the Control samples showed considerably higher melting temperatures than the polyesters reported in TABLE 1.

What is claimed is:

1. A melt-processable polyester comprising repeating radicals of the formulas

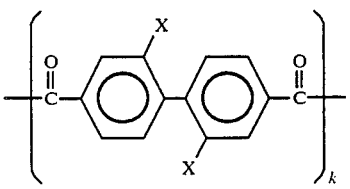

(I)

wherein X is a substituent other than hydrogen, and k represents the molar amount of the formula (I) radical in the polyester;

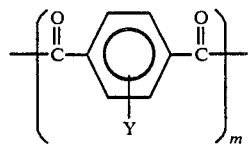

(II)

wherein Y is hydrogen or a substituent other than hydrogen, and m represents the molar amount of the formula (II) radical in the polyester;

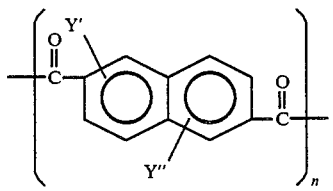

(III)

wherein each of Y' and Y" represents hydrogen or a substituent other than hydrogen, and n represents the molar amount of the formula (III) radical in the polyester; and

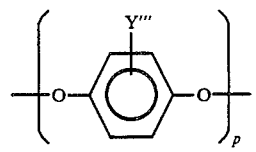

(IV)

wherein Y''' is hydrogen or a substituent other than hydrogen, and p represents the mole ratio of the formula (IV) radical in the polyester; the molar proportions of formula (I), (II), (III) and (IV) radicals conforming to the following relationships:

$$\frac{k}{k + m + n} = 0.2 \text{ to } 0.8;$$

$$\frac{m}{k + m + n} = 0 \text{ to } 0.8;$$

$$\frac{n}{k + m + n} = 0 \text{ to } 0.8;$$

$$\frac{m + n}{k + m + n} = 0.2 \text{ to } 0.8; \text{ and}$$

$$\frac{k}{k + m + n} + \frac{m + n}{k + m + n} = \frac{p}{k + m + n}.$$

2. The polyester of claim 1 wherein, in said formula (I) radical, each X group is independently halogen, nitro, alkoxy or substituted-alkyl.

3. The polyester of claim 2 wherein each of said X groups is a substituted-alkyl.

4. The polyester of claim 3 wherein each of said X groups is trifluoromethyl.

5. The polyester of claim 1 wherein, in said formula (II) radical, Y is hydrogen or a substituted-alkyl.

6. The polyester of claim 5 wherein said Y is hydrogen.

7. The polyester of claim 5 wherein said Y is trifluoromethyl.

8. The polyester of claim 1 wherein, in said formula (III) radical, each of Y' and Y" is hydrogen.

9. The polyester of claim 1 wherein, in said formula (IV) radical, Y''' is hydrogen, halogen or alkyl.

10. The polyester of claim 9 wherein Y''' is chloro.

11. The polyester of claim 9 wherein said Y''' is methyl.

12. The polyester of claim 1 wherein said n is zero, the ratio of k to the sum of k and m is in the molar range of from 0.3 to 0.6, and the ratio of m to the sum of k and m is in the molar range of from 0.3 to 0.6.

13. The polyester of claim 12 wherein each of said molar ratios is about 0.5.

14. The polyester of claim 12 wherein, in said formula (I) radical, each X group is trifluoromethyl.

15. The polyester of claim 14 wherein, in said formula (II) radical, Y is trifluoroalkyl.

16. The polyester of claim 15 wherein, in said formula (IV) radical, Y' is chloro.

17. The polyester of claim 15 wherein, in said formula (IV) radical, Y''' is hydrogen.

18. The polyester of claim 15 wherein, in said formula (IV) radical, Y''' is methyl.

19. The polyester of claim 14 wherein, in said formula (II) radical, Y is hydrogen.

20. The polyester of claim 19 wherein, in said formula (IV), Y''' is chloro.

21. The polyester of claim 1 in the form of a molecularly oriented film or fiber.

22. A melt-processable polyester comprising repeating units of the formula

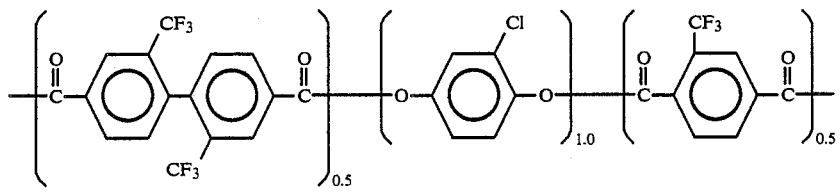

wherein each subscript represents the molar amount of the respective radical in said polyester.

* * * * *